United States Patent
Lapp et al.

(10) Patent No.: US 9,536,572 B2
(45) Date of Patent: Jan. 3, 2017

(54) APPARATUS WITH SEALED CAVITY FORMED BY AT LEAST ONE IMPERMEABLE WELD

(71) Applicant: Seagate Technology LLC, Cupertino, CA (US)

(72) Inventors: David Ray Lapp, Boulder, CO (US); Loh Yut Chai, Zhuhai (CN); Wolfgang Rosner, Burnsville, MN (US); Law Kung Ying, Singapore (SG); Neal Frank Gunderson, Lake Elmo, MN (US); Scott Vogel Mitzner, Denver, CO (US); Krithika Kalyanasundaram, Longmont, CO (US)

(73) Assignees: Seagate Technology LLC, Cupertino, CA (US); Cheung Woh Technologies LTD, Singapore (SG)

( * ) Notice: Subject to any disclaimer, the term of this patent is extended or adjusted under 35 U.S.C. 154(b) by 0 days.

(21) Appl. No.: 14/280,186

(22) Filed: May 16, 2014

(65) Prior Publication Data

US 2015/0332733 A1 Nov. 19, 2015

(51) Int. Cl.
| | |
|---|---|
| *G11B 33/12* | (2006.01) |
| *G11B 33/14* | (2006.01) |
| *G11B 33/02* | (2006.01) |
| *H02K 5/12* | (2006.01) |
| *G11B 25/04* | (2006.01) |

(52) U.S. Cl.
CPC ......... *G11B 33/1486* (2013.01); *G11B 25/043* (2013.01); *G11B 33/022* (2013.01); *G11B 33/121* (2013.01); *G11B 33/1446* (2013.01); *H02K 5/12* (2013.01); *Y10T 29/49005* (2015.01); *Y10T 29/49828* (2015.01)

(58) Field of Classification Search
CPC ....... G11B 33/02; G11B 33/027; G11B 33/08; G11B 33/14; G11B 33/1446; G11B 33/12; G11B 33/121
USPC .................... 360/97.11, 97.21, 99.15, 99.16, 99.18,360/99.2, 99.21
See application file for complete search history.

(56) References Cited

U.S. PATENT DOCUMENTS

| | | | |
|---|---|---|---|
| 5,081,552 A | 1/1992 | Glaser et al. | |
| 5,223,996 A | 6/1993 | Read et al. | |
| 5,546,250 A | 8/1996 | Diel | |
| 5,822,152 A | 10/1998 | Seaver et al. | |
| 6,005,747 A | 12/1999 | Gilovich | |
| 6,034,841 A | 3/2000 | Albrecht et al. | |
| 6,226,143 B1 | 5/2001 | Stefanksy | |
| 6,426,847 B1 | 7/2002 | Dague et al. | |
| 6,469,864 B2* | 10/2002 | Kamezawa et al. | ....... 360/97.21 |
| 6,954,328 B2 | 10/2005 | Daniel et al. | |
| 7,146,713 B1 | 12/2006 | Ying | |
| 7,224,550 B2 | 5/2007 | Yao et al. | |
| 7,307,811 B2 | 12/2007 | Xu et al. | |

(Continued)

*Primary Examiner* — Jefferson Evans
(74) *Attorney, Agent, or Firm* — Crawford Maunu PLLC

(57) ABSTRACT

Certain exemplary aspects of the present disclosure are directed towards an apparatus in which a base deck and a forged base deck cover are coupled to one another, via a weld joint, to provide a hermetically sealed cavity within. The base deck includes an outer region, and the base deck cover includes a lip that interfaces with the outer region of the base deck to provide the weld joint. Similarly, the base deck is formed by an outer region of a base deck bottom portion interfacing with a lip of the shroud to form, via welding, the base deck.

20 Claims, 7 Drawing Sheets

(56) References Cited

U.S. PATENT DOCUMENTS

| | | | |
|---|---|---|---|
| 7,362,541 B2 * | 4/2008 | Bernett | G11B 33/1466 360/99.21 |
| 7,483,238 B2 | 1/2009 | Xu et al. | |
| 7,564,645 B2 | 7/2009 | Tsuda et al. | |
| 7,616,400 B2 | 11/2009 | Byun et al. | |
| 7,742,316 B2 | 6/2010 | Ho et al. | |
| 7,760,464 B2 | 7/2010 | Xu et al. | |
| 7,826,171 B2 | 11/2010 | Johnston et al. | |
| 7,921,543 B2 | 4/2011 | Trongjitwikrai et al. | |
| 8,014,167 B2 * | 9/2011 | Gunderson et al. | 361/800 |
| 8,279,552 B2 | 10/2012 | Stipe | |
| 8,514,514 B1 * | 8/2013 | Berding et al. | 360/97.11 |
| 8,553,357 B1 | 10/2013 | Sorenson, III et al. | |
| 9,048,042 B2 * | 6/2015 | Steuer | H01R 13/5202 |
| 2004/0222340 A1 * | 11/2004 | Richardson | 248/176.1 |
| 2005/0068666 A1 * | 3/2005 | Albrecht | G11B 33/1466 360/99.18 |
| 2005/0270690 A1 * | 12/2005 | Gunderson | 360/97.02 |
| 2006/0050429 A1 * | 3/2006 | Gunderson | G11B 33/122 360/99.21 |
| 2006/0186019 A1 * | 8/2006 | Lu | A45D 33/003 206/581 |
| 2007/0183088 A1 * | 8/2007 | Hatchett et al. | 360/97.02 |
| 2008/0007866 A1 * | 1/2008 | Hayakawa et al. | 360/97.02 |
| 2008/0088969 A1 * | 4/2008 | Uefune | G11B 33/1466 360/99.21 |
| 2008/0212237 A1 * | 9/2008 | Uefune et al. | 360/254 |
| 2009/0241322 A1 * | 10/2009 | Uefune | G11B 25/043 29/603.01 |
| 2011/0038076 A1 * | 2/2011 | Hayakawa | G11B 33/1486 360/97.16 |
| 2011/0310509 A1 * | 12/2011 | Stipe | G11B 25/043 360/97.22 |
| 2012/0275054 A1 | 11/2012 | McGuire, Jr. et al. | |
| 2013/0170074 A1 * | 7/2013 | Hayakawa | G11B 33/148 360/97.22 |
| 2013/0222947 A1 * | 8/2013 | Sugii | G11B 23/505 360/99.08 |

* cited by examiner

APPARATUS WITH SEALED CAVITY FORMED BY AT LEAST ONE IMPERMEABLE WELD

SUMMARY

Various example embodiments are directed to apparatuses and/or methods that facilitate the coupling of components with relatively low permeability, and may be implemented under conditions in which material, size/spacing for the coupling, and coupling techniques may impact coupling and the resulting permeability. Certain embodiments achieve such low permeability by enhancing the coupling depth of components and utilizing materials with improved coupling characteristics, such as may be implemented to address porosity or other issues. In some implementations, such approaches are achieved while also limiting or reducing overall width of a bond between components. One or more of these embodiments may be particularly applicable, for example, to disc drives (sometimes referred to as disk drives) in which a bond between components operates to mitigate or prevent the escape of low density atmosphere from within the disc drive, while also achieving compact construction.

In a particular embodiment, a base deck is formed by welding a forged base deck bottom portion to an extruded shroud, at an interface of a first outer region of the forged base deck bottom portion and a lip of the extruded shroud. In some implementations, the extruded shroud is forged after extrusion to add features, such as on one or more end surfaces, which can be used to improve tolerances. This approach can also be used to reduce fabrication time. The resultant welded base deck assembly forms a tall cavity, which can be used in the assembly of a disc drive. In some implementations, a partially hermetic screw on cover is used during a testing stage of such a disc drive, and a final cover (e.g., stamped) is welded to the top of the extruded shroud. The welds hermetically seal a cavity defined by the base deck and shroud assembly, and the base deck cover. In some implementations, this use of wrought materials, both forged and extruded (e.g., aluminum alloy 6061) for the base deck bottom, shroud, and base deck cover (e.g., aluminum alloy 4047) facilitates a reduced permeability path within the resulting welds, with materials that are less prone to porosity growth and joining due to stress cracking over the life of a disc drive. These characteristics such as reduced porosity of the weld allow for a significantly decreased weld thickness, and a compact coupling area. In many embodiments, low porosity wrought aluminum alloys compatible with extrusion and forging methods are used to facilitate welding. Using approaches as described herein, the effective yield rate of hermetically sealed disc drive assemblies is substantially enhanced, addressing various problems including the problems discussed herein.

Various example embodiments are directed to methods and/or apparatuses that involve providing a hermetic seal between a forged base deck bottom, extruded shroud, and base deck cover. These and other embodiments may be implemented to address challenges that may occur when parts of the same aluminum alloy are welded together, such as hot cracking problems that may occur when a weld joint fails to re-alloy. In some embodiments, a shim of a different aluminum alloy is placed between parts to be coupled together via welding.

Consistent with further embodiments, other aspects are directed toward an apparatus that includes a base deck bottom portion and shroud that are welded together to form a base deck, in which an interior joint between the base deck bottom portion and shroud are either fully welded (without being hermetic), spot welded or partially-welded. This approach can provide stiffness and mitigate the vibration of features of a base deck that would otherwise vibrate during welding or secondary operation machining (which may otherwise result in cutter chatter marks), and also improve the structural integrity of the resulting disc drive.

In some embodiments (e.g., without a full interior weld), the apparatus includes a mechanical labyrinth between interior and exterior joints of the base deck bottom portion and shroud, which helps to mitigate or prevent any cavity between joints from collecting unwanted materials, such as plating or cleaning liquids that may otherwise collect and detriment the performance of the disc drive. In certain embodiments, the labyrinth is filled with a polymer material, One or more of the above approaches may, in accordance with one or more embodiments, involve forming a hermetically sealed housing that contains a low density and/or a low oxygen/% RH atmosphere. In some implementations, such a housing supports a spindle motor that rotates a data storage medium, and an actuator assembly that supports at least one data transducer adjacent the at least one data storage medium.

Consistent with various other embodiments and aspects of the present disclosure, a method is disclosed in which the porosity of a weld between a base deck bottom portion and shroud, as well as the weld between the base deck and base deck cover, is controlled and/or reduced by removing e-plating on welding surfaces. In some instances, the plating is removed without reducing horizontal weld lip surface, while also maintaining overall dimensions of a disc drive (within the form factor limitations). In a particular embodiment, a forged lip is implemented at the top of a shroud that is machined to remove e-plating. The removal of the plating further reduces occurrences of hot cracking, porosity, and other material issues that affect the weld.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1A:
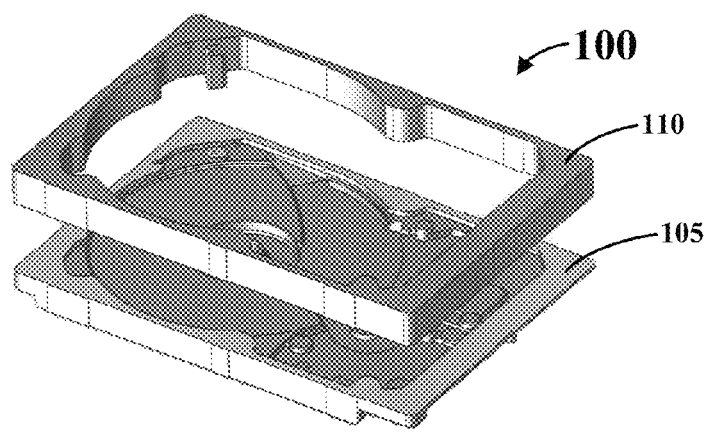
FIG. 1A is an exploded view of a forged base deck bottom portion and extruded shroud, consistent with various aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present invention are believed to be applicable to a variety of different types of methods, devices, systems and arrangements involving joint welding and hermetically sealed cavities, as may be implemented for sealing disc drives. Specific embodiments are believed to be particularly beneficial to sealed disc drive apparatuses, such as disc drives containing low density atmosphere (e.g., helium atmosphere below, at or above a standard Earth atmospheric pressure). While the present invention is not necessarily so limited, various aspects of the invention may be appreciated through a discussion of examples using this context.

Various example embodiments are directed to apparatuses and/or methods that facilitate the coupling of components with relatively low permeability, under conditions in which material, size/spacing for the coupling, and coupling techniques may undesirably impact coupling and the resulting permeability. Certain embodiments achieve such low permeability by enhancing the coupling depth of the components and utilizing materials with improved coupling characteristics. In some implementations, such approaches are achieved while also limiting or reducing overall width of a bond that couples components together. One or more of these embodiments may be particularly applicable, for example, to disc drives in which the bond between components operates to mitigate or prevent the escape of low density atmosphere from within the disc drive, while also achieving compact construction. In conjunction with one or more such embodiments, it has been discovered that an approach involving specific welding implementations can achieve a bond that is substantially free of voids, cracks, and porosity, that may otherwise increase a leakage rate of low density atmosphere from within the disc drive and/or passage of material into the disc drive. Welding as used herein may, for example, involve aspects of coupling materials involving soldering, brazing and/or welding in which an additional material is presented and used to generate a melt pool between two materials.

In one embodiment of the present disclosure, a base deck is formed by joining a first outer region of a forged base deck bottom portion to a lip of an extruded shroud. The lip interfaces with the first outer region for welding, via a first weld, the extruded shroud to the forged base deck bottom. The base deck is then joined, via a second weld, to a base deck cover (e.g., stamped or forged) including a second outer region by interfacing the second outer region with the lip of the extruded shroud. The first and second welds hermetically seal a cavity defined by the base deck and the base deck cover, when welded/joined together. In some more specific embodiments, the cavity holds an amount of low density atmosphere, and the first and second welds provide a total rate of low density atmosphere leakage from the cavity that is not greater than 1% of the drive cavity or 1 $cm^3$/year ($1\times10^{-8}$ $cm^3$/sec) for a 3.5" form factor disc drive. In certain implementations, a forged base deck is formed with a relatively thin wall (e.g., 0.5 mm) at bottom of blind threaded holes, as may be implemented with a sealed drive.

In further more specific embodiments, the base deck bottom portion and shroud include base deck features such as turbulence reducing features, and filter mounts, as may be facilitated via forging of the bottom and extrusion of the shroud. In some implementations, the first weld has a varying weld depth that follows one or more such base deck features proximate the weld (e.g., to ensure the weld does not interfere with or otherwise adversely affect the features). Where allowable by proximate features, the weld depth may be increased to facilitate reduced atmosphere leakage from the cavity, which can extend the useful life of the disc drive.

In a particular embodiment, a base deck is formed by welding a base deck bottom portion to an extruded shroud. The base deck bottom portion and the extruded shroud are welded together at the interface of a first outer region of the forged base deck bottom portion and a lip of an extruded shroud. The extruded shroud is then welded to a forged base deck cover at the interface of the lip of the extruded shroud and the second outer region of the forged base deck cover. The resulting welds hermetically seal a cavity defined by the base deck and the forged base deck cover. Specifically, the use of forged, extruded (e.g., aluminum alloy 6061) and other materials, such as stamped wrought materials (e.g., aluminum alloy 4047) for the base deck bottom shroud and base deck cover, facilitates a reduced permeability path within the resulting welds and are less prone to porosity growth and joining due to stress cracking over the life of one or more components within the cavity, such as a disc drive. This reduced porosity of the weld allows for a significantly decreased weld thickness (e.g., as may be required with higher porosity), while achieving a compact coupling area. In many embodiments, low porosity aluminum alloys compatible with extrusion and forging methods, laser welding, dip or vacuum oven aluminum brazing, or soldering can be utilized. Using approaches as described herein (related to the use of forged and extruded wrought aluminum parts), the effective yield rate of hermetically sealed disc drive assemblies is substantially enhanced, addressing various problems including those related to welding die-cast aluminum parts and other problems discussed herein.

In a more particular embodiment, the base deck cover includes an elongated vertical portion that extends downward along a direction that is parallel to a line defining the exterior of the base deck, with an interface between the base deck cover and base deck defining the location of a second weld. Accordingly, the second weld is made along the side of the disc drive (e.g., and not around the perimeter of the top of the disc drive). In such an embodiment, the increased interface between the base deck and the base deck cover allows for increased weld depth and width, and may be implemented with an epoxy final seal.

Various example embodiments are directed to methods and/or apparatuses that involve providing a hermetic seal between a base deck bottom, extruded shroud, and base deck cover. In one embodiment, a forged base deck bottom, extruded shroud, and forged base deck cover are made of a first aluminum alloy, and a different material is added to interfaces between these components to mitigate issues that may occur when parts of the same aluminum alloy are welded together. For instance, weld joints involving the same aluminum alloy may fail to re-alloy, with the result being a joint prone to hot cracking. To solve this problem, a different type of aluminum alloy is introduced to and used in the weld (e.g., by placing shims or filler between components, or by using a particular alloy for a stamped final base deck cover) to address such issues.

In a specific embodiment involving the coupling of 6000 series aluminum alloy parts, a 4000 series aluminum alloy shim, such as a 4047 or 4043 series shim, is used to weld a 6000 series aluminum alloy forged base deck bottom and extruded shroud. Likewise, a final base deck cover is stamped from 4047 wrought aluminum alloy and welded to the 6000 series shroud. During welding, the 4000 series aluminum alloy is melted into a weld puddle with the 6000 series aluminum alloy, and the mixture is used to ensure realloying of the 6000 series parts being coupled. Such an approach can reduce or eliminate the occurrence of hot cracking, and forms a hermetic weld joint exhibiting a low failure rate.

Consistent with further embodiments, other aspects are directed toward an apparatus that includes a base deck bottom portion and shroud that are welded together to form a base deck, in which an interior joint between the base deck bottom portion and shroud are fully welded, spot welded or partially-welded to stiffen features that may otherwise vibrate during welding and/or other operations. In certain embodiments where a full inside weld is not used or possible, a mechanical labyrinth is formed between an interior joint and an exterior joint base deck bottom portion and extruded shroud, and can be filled with a polymer-type material such as epoxy. In some instances, the mechanical labyrinth includes a plurality of lips of the base deck bottom and cavities of the shroud that interface to form the labyrinth. The mechanical labyrinth can prevent the collection of unwanted materials (e.g., plating and cleaning liquids) that may otherwise collect and affect the performance of components, such as a disc drive, within the cavity.

In some embodiments, an approach consistent with one or more of the above embodiments involves forming a hermetically sealed disc drive housing that contains a low density atmosphere, such as a helium atmosphere, that facilitates operation of a disc drive within the housing. The housing supports a spindle motor that rotates a data storage medium, an actuator assembly that internally supports the spindle motor, and an actuator assembly that supports at least one data transducer adjacent the at least one data storage medium.

Consistent with various other embodiments and aspects of the present disclosure, a method is disclosed in which the porosity of a weld between a base deck bottom portion and shroud, as well as the weld between the base deck and base deck cover, is controlled by removing e-plating on welding surfaces. In some instances, the plating is removed without reducing horizontal weld lip surface area, while also maintaining the overall dimensions of the disc drive (within the form factor limitations). In one embodiment, a forged lip is implemented at the top of the shroud, and is machined to remove plating. The removal of such plating may mitigate or reduce occurrences of hot cracking, porosity, and other material issues that may affect the weld seal.

In some embodiments, an enclosure housing a disc drive as discussed above also includes a secondary base deck cover that provides a temporary/non-hermetic seal. The secondary base deck cover is used to provide a low-density atmosphere for operationally testing the disc drive prior to hermetically sealing the drive via welding of the base deck cover to the base deck. In the case of a failed operational test, the disc drive may be re-worked by removing the secondary base deck cover, and the assembly process is repeated, minimizing scrap.

In a specific/detailed embodiment, a shroud and base deck bottom are both forged with opposing draft angles that facilitate joining via welding. In some instances, the base deck bottom has a draft that decreases vertically, and the shroud has a draft that increases vertically, such that a point at which the components interface is at an inward-facing region. After welding the base deck bottom to the shroud, portions of the shroud and base deck bottom protruding outward along the draft angles are removed, along with weld protrusion, to form a generally vertical outer sidewall. This approach can improve the quality of the weld between the base deck bottom portion and the shroud, such as by facilitating the use of butt joints that can be easier to weld and facilitate overall weld quality.

In many applications, a welding joint as discussed herein is implemented to maintain a rate of low density atmosphere leakage from a disc drive enclosure via an interface between a base deck and base deck cover that is not greater than 1 $cm^3$/year ($4 \times 10^{-8}$ $cm^3$/sec) for a 3.5" form factor disc drive. Such a low maintained leakage rate can achieve less than 5% leakage (5 $cm^3$ for a 3.5" form factor disc drive) of an initial low density atmosphere of about 100 $cm^3$ in a 3.5" form factor disc drive enclosure.

Turning now to the figures, various embodiments of the present disclosure are presented by way of the illustrations. FIG. 1A is an exploded view of a base deck including a forged base deck bottom portion 105 and an extruded shroud 110. The forged base deck bottom portion 105 and the extruded shroud 110 are coupled together by welding the exterior perimeter of a joint between the two. Various welding techniques may be used, such as tungsten inert gas welding, gas tungsten arc welding, laser welding, plasma welding, friction stir welding, and others.

Figure 1B:
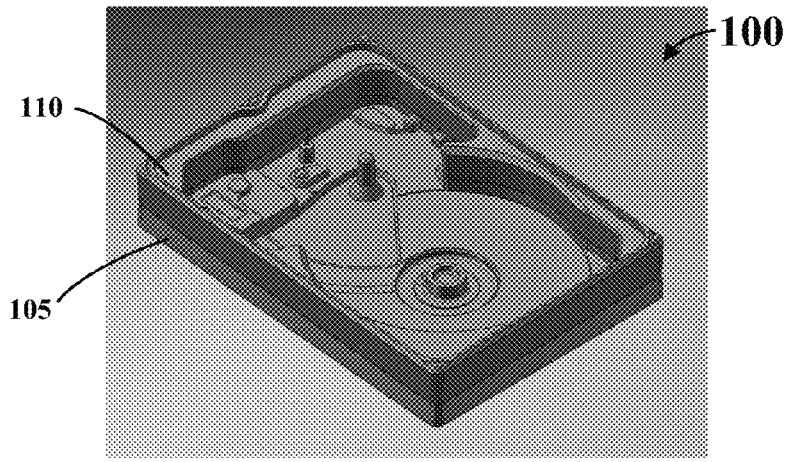
FIG. 1B is a perspective view of a welded base deck, consistent with various aspects of the present disclosure.

FIG. 1B shows the forged base deck bottom portion 105 and the extruded shroud 110 coupled together via an exterior perimeter weld, to form the base deck 100. In some implementations, an interior perimeter of the joint between the forged base deck bottom portion 105 and the extruded shroud 110 is welded or spot welded. Welding the interior perimeter of the base deck 100 may strengthen the resulting structure, and may also prevent contaminants such as cleaning and plating liquids from settling between the base deck bottom portion 105 and the extruded shroud 110. As an alternative or in conjunction with an interior perimeter weld, the joint is vacuum impregnated with epoxy and/or a mechanical labyrinth may be implemented therebetween.

Figure 1C:
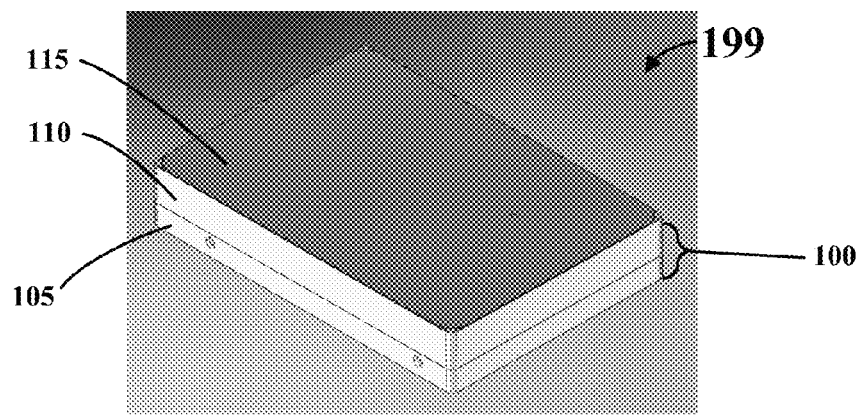
FIG. 1C is a perspective view of a welded disc drive enclosure, consistent with various aspects of the present disclosure.

FIG. 1C shows a hermetically sealed disc drive 199 in accordance with aspects of the present disclosure. The base deck 100 of FIG. 1B is populated with mechanical and electrical components necessary for the proper operation of a hard disc drive and filled with a low density atmosphere (e.g., a helium atmosphere). To hermetically seal the disc drive 199, a base deck cover 115 has been welded to the base deck 100. The 4000 series aluminum alloy of the base deck cover 115 is melted into the weld puddle with a 6000 series aluminum alloy from extruded shroud 110. The weld couples the outer perimeter of the base deck 100 to the outer perimeter of the base deck cover 115, sealing the disc drive 199. In various embodiments, one or more aspects of FIGS. 1A-1C are implemented in connection with one or more other embodiments as discussed herein.

Figure 2:
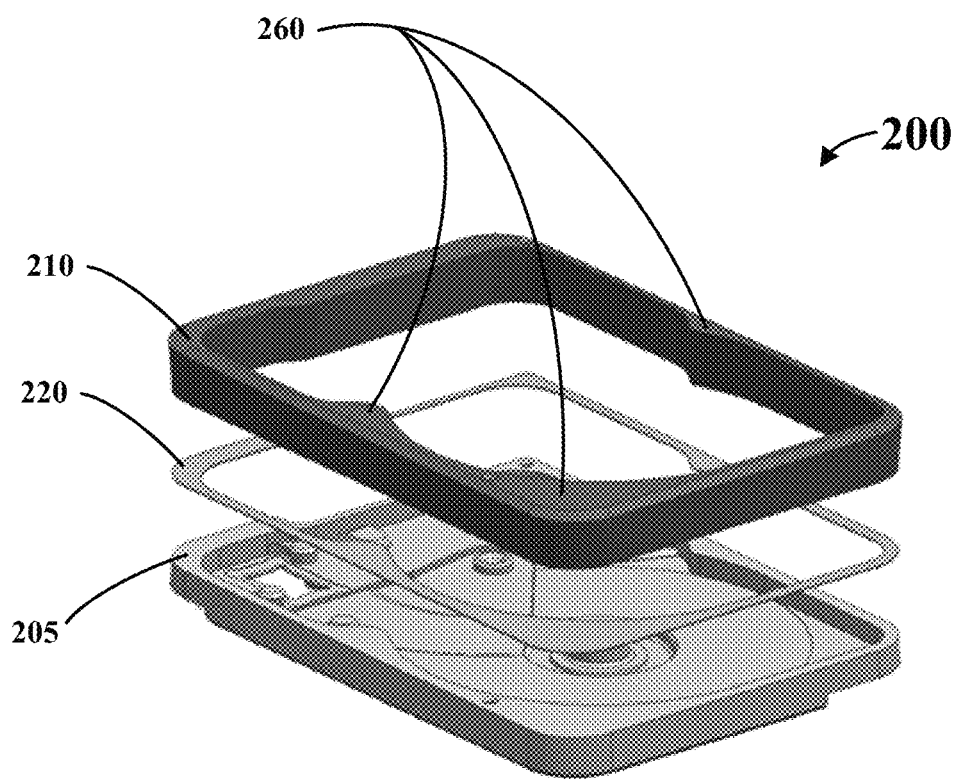
FIG. 2 is an exploded view of a base deck bottom portion, shim, and extruded shroud, consistent with various aspects of the present disclosure.

FIG. 2 shows an exploded view of a base deck 200 including a base deck bottom portion 205, shim 220, and extruded shroud 210. In connection with one or more embodiments, it has been recognized/discovered that the use of a shim 220 between the base deck bottom portion and extruded shroud may address issues upon welding of the components, such as incomplete realloying at the location of the weld. As such, the shim 220 is used to provide material in a melt pool between the base deck bottom 205 and the extruded shroud 210, to facilitate realloying and desirable joining of the respective components to form the base deck.

In a particular embodiment, the shim 220 includes a 4000 series aluminum alloy that is melted into the weld puddle with a 6000 series aluminum alloy from the respective base deck bottom 205 and extruded shroud 210. The shim is used to ensure realloying of the 6000 series parts being coupled, mitigates or eliminates the occurrence of hot cracking, and forms a hermetic weld joint with low failure rates. The interior joint between the base deck bottom portion 205, the shim 220, and the extruded shroud 210 can also be welded (or spot welded) together, and may involve using the shim in a similar manner. As an alternative to and/or in addition to welding, the interior joint may be filled such as by using vacuum epoxy impregnation, or mechanical labyrinths may be used at the joint to prevent cleaning and plating solutions from intruding between the components being welded.

In some embodiments, the base deck 200 is formed with a varying weld depth that reduces/mitigates atmosphere leakage, once the disc drive has been sealed. For instance, features 260 (e.g., turbulence reducing features or filter mounts) along the perimeter may facilitate increased weld depth, by way of increased thickness of the wall portions. Accordingly, the weld depth can be varied according to one or more of the features 260 proximate the weld. The increased weld depth, where allowed by such proximate features 260, can strengthen the structure and provide for further reduced atmosphere leakage from a resulting cavity formed in part by the base deck 200 ($<1\times10^{-8}$ cm$^3$/sec for a 3.5" form factor disc drive), which can extend the useful life of the disc drive. Such an embodiment may also be used in applications where the low density atmosphere leak rate from the disc drive must be less than 1%/year.

Figure 3:
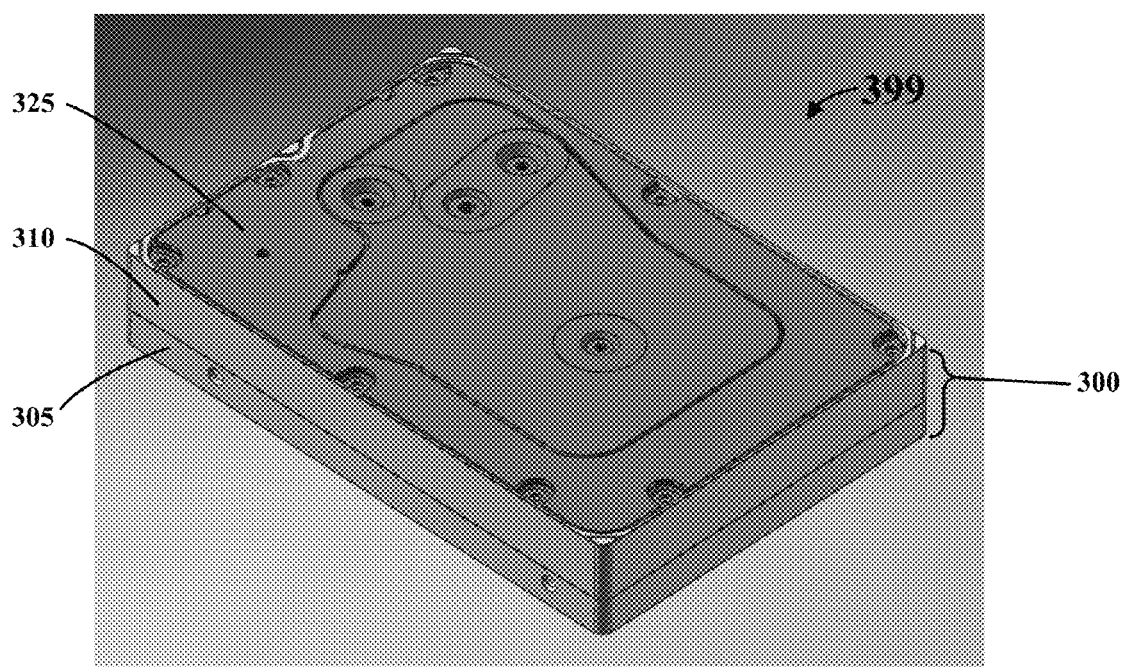
FIG. 3 is a perspective view of a welded base deck interfacing with a temporary base deck cover to provide a temporary sealed cavity, consistent with various aspects of the present disclosure.

FIG. 3 shows a disc drive 399 welded base deck 300 interfacing with a temporary base deck cover 325 that provides a temporary/non-hermetic seal, consistent with various aspects of the present disclosure. Such a secondary base deck cover 325 can be coupled to the base deck 300 (including base deck bottom portion 305 and extruded shroud 310) via screw or other fastener or fastening approach. The temporary (e.g., non-hermetical) seal may, for example, be provided by a gasket between the secondary base deck cover 325 and base deck 300. The secondary base deck cover 325 allows a disc drive 399 to be filled with a low-density atmosphere and operationally tested prior to hermetically sealing the drive via the base deck cover (not shown). In the case of a failed operational test, the disc drive 399 may be re-worked by removing the secondary base deck cover 325, and the assembly process is repeated, minimizing scrap.

Figure 4A:
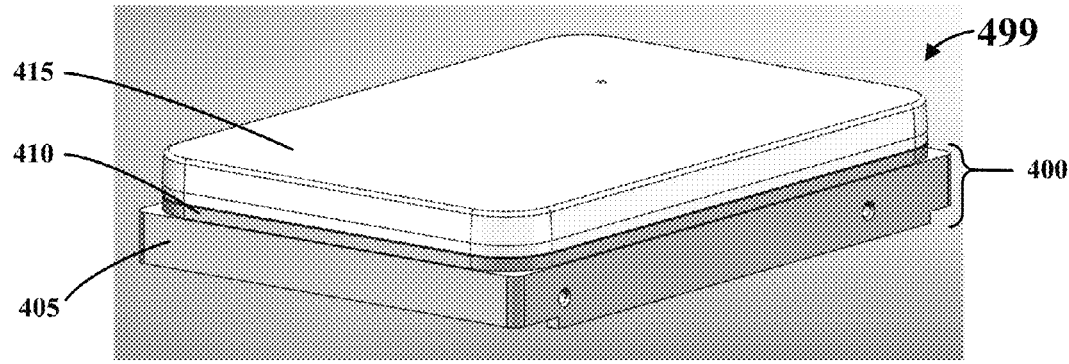
FIG. 4A is a perspective view of a welded disc drive, consistent with various aspects of the present disclosure.
Figure 4B:
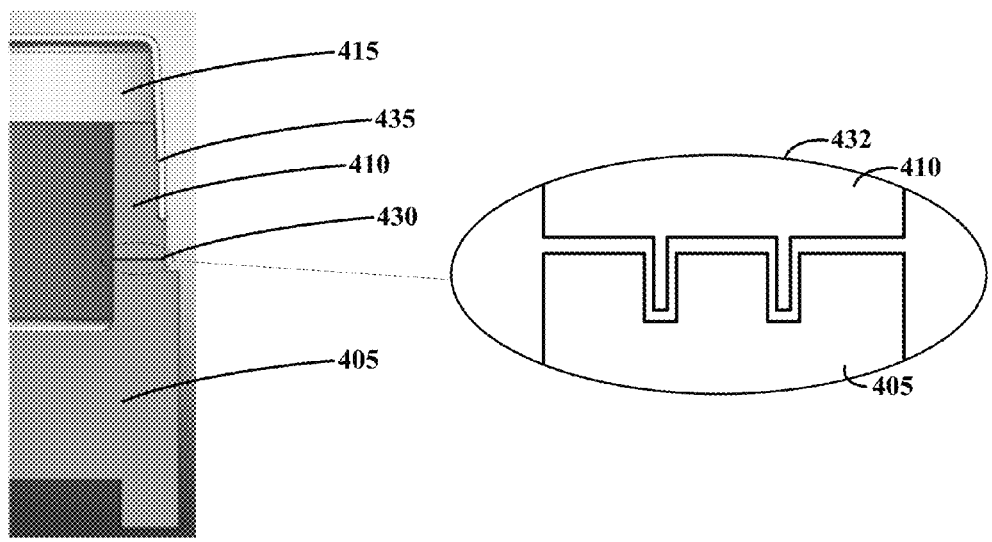
FIG. 4B is a partial cross-sectional side view of weld joints within a welded disc drive enclosure, consistent with various aspects of the present disclosure.

FIG. 4A is a perspective view of a welded disc drive 499 that hermetically seals a low density atmosphere within. In such an embodiment, base deck 400 (including base deck bottom portion 405 and extruded shroud 410) is partially encapsulated by base deck cover 415. As shown in FIG. 4B (a partial cross-sectional side view of FIG. 4A) weld joints 430 and 435 couple the components together, with weld joint 435 extending vertically between the base deck 400 and the base deck cover 415. In some instances, the base deck cover 415 includes a 4000 series aluminum alloy that is melted into a weld puddle with a 6000 series aluminum alloy from extruded shroud 410. This approach facilitates an increased weld width, which can further reduce low density atmosphere leakage from the disc drive 499. In some embodiments, the second vertical weld joint 435 has a sufficient length that allows an epoxy seal (as an alternative, or in conjunction with welding). This approach allows both the second weld joint 435 and a first weld joint 430 to be completed via a horizontal welding orientation.

Figure 5:
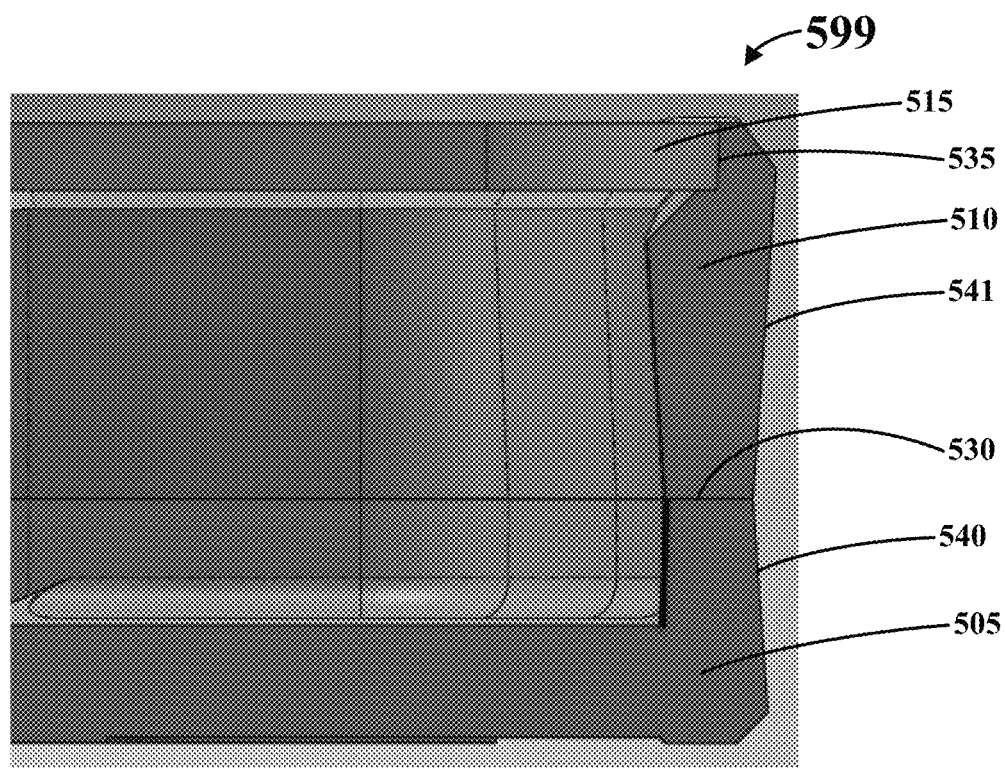
FIG. 5 is a partial cross-sectional side view of weld joints within a welded disc drive enclosure, consistent with various aspects of the present disclosure.

FIG. 5 shows a specific/detailed embodiment, by way of a partial cross-sectional side view of joints 530 and 535 within a welded disc drive 599 having a base deck bottom portion 505, extruded shroud 510, and base deck cover 515. In this particular embodiment, the extruded shroud 510 and base deck bottom portion 505 utilize a forging process and related tool. To allow removal from the forging dies of the parts during manufacturing, the tool is designed with draft angles at an outer perimeter at 540 and 541, to minimize surface-to-surface contact between the tool and part. Accordingly, the base deck bottom portion 505 and shroud 510 are manufactured with opposite draft angles (the base deck bottom 505 has a draft that decreases vertically, and the shroud 510 has a draft that increases vertically), with the respective components meeting at joint 530. After welding the base deck bottom 505 to the shroud 510 at joint 530, the portions of the base deck bottom and shroud 510 along outer walls at 540/541, along with any weld protrusion at joint 530, can be removed (e.g., by a machining operation) to produce a vertical wall, (e.g., within prerequisite hard disc drive form factor such as a 2.5" or 3.5" form factor). Such an approach can be similarly implemented in a transition between FIGS. 1B and 1C, with respective draft angles of base deck bottom portion 105 and extruded shroud 110 shown in FIG. 1B having been removed to form a vertical sidewall as shown in FIG. 1C.

Figure 6:
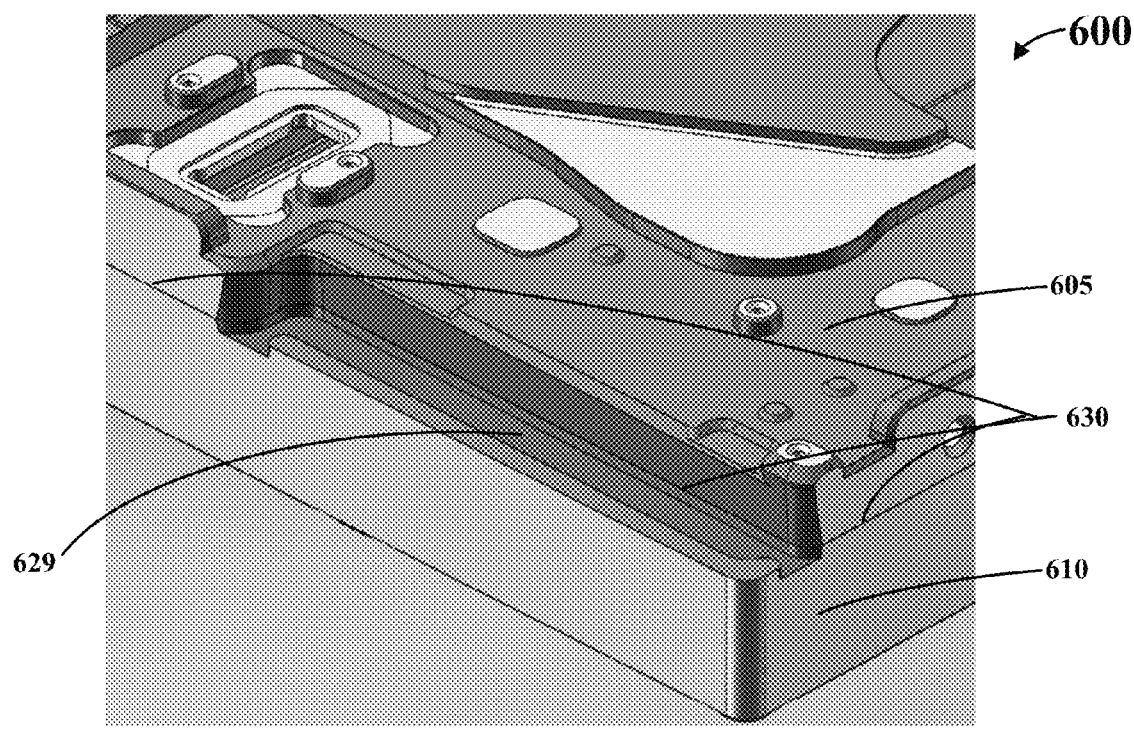
FIG. 6 is a perspective view of a welded disc drive enclosure with butt joints, consistent with various aspects of the present disclosure.

FIG. 6 shows a specific/detailed embodiment including a perspective view of a welded base deck 600 with butt joints 630, consistent with various aspects of the present disclosure. The base deck 600 includes upper and lower portions 605 and 610, welded together. Recesses 629 are added and used to set the thickness of welded sections at the joint 630 to be roughly equal. In connection with this embodiment, it has been recognized/discovered that the use of such recesses in this regard can address issues that may arise due to varying thicknesses, such as those issues relating to weld imperfections that may affect or prevent hermetic sealing of a low density atmosphere.

Figure 7:
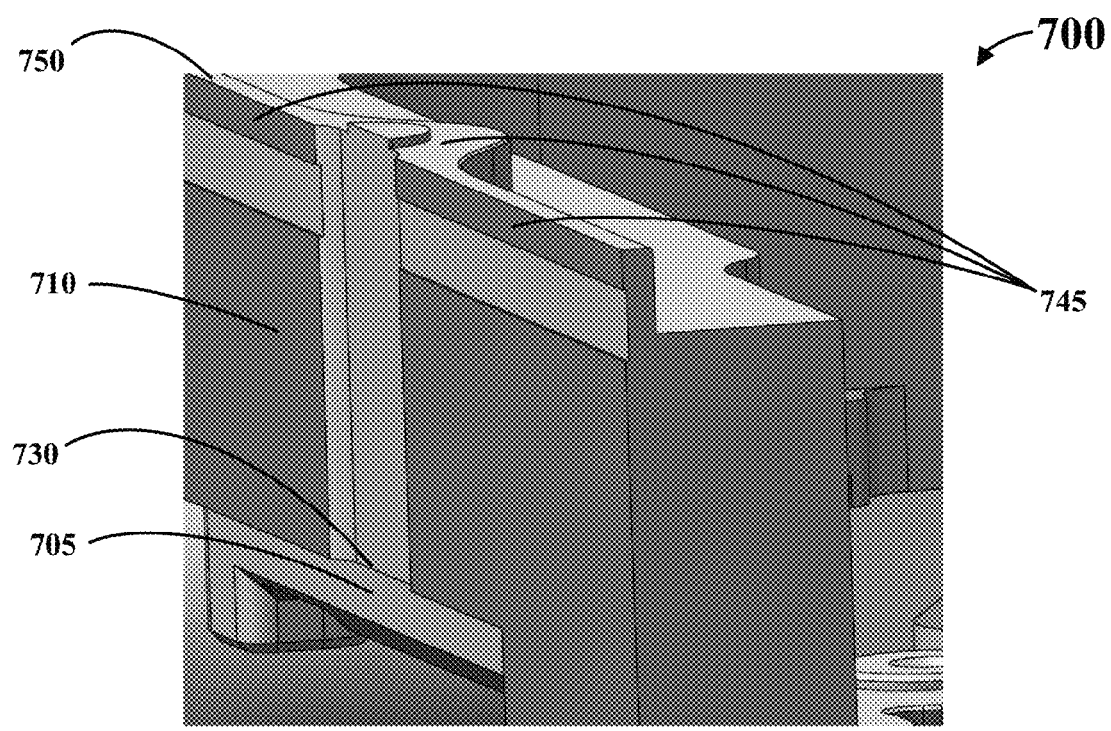
FIG. 7 is a partial perspective view of a welded base deck with machined surfaces, consistent with various aspects of the present disclosure.

FIG. 7 shows a specific/detailed embodiment including a partial perspective view of a welded base deck 700 with machined surfaces 745. In this embodiment, plating (e.g., on surfaces 730 and 745) is removed to mitigate weld imperfections between a base deck bottom portion 705 and shroud 710, as well as imperfections with a weld between the base deck 700 and a base deck cover (when welded at an upper surface thereof). In some implementations, the plating is removed without reducing the horizontal weld lip surface 750 while also maintaining the overall dimensions of the disc drive (within the form factor limitations). The removal of such plating, prior to welding, reduces occurrences of hot cracking, porosity, and other material issues that affect the resulting weld's ability to hermetically seal a low density atmosphere within.

Based upon the above discussion and illustrations, those skilled in the art will readily recognize that various modifications and changes may be made to the present disclosure without strictly following the exemplary embodiments and applications illustrated and described herein. For example, the shape and location of the joints and joining methodologies need not conform to the exemplary embodiments discussed herein; hermetically sealed apparatuses as claimed may cover a wide variety of shapes and variations of such a welded/hermetically sealed structure, including irregular joints (e.g., mechanical labyrinths), non-parallel joints, and welding components with varying length/width/thickness. Such modifications do not depart from the true spirit and scope of the present disclosure, including that set forth in the following claims.

What is claimed is:

1. An apparatus comprising:
   a base deck including
      a forged base deck bottom portion including a first outer region,
      an extruded shroud including a lip, the lip configured and arranged for interfacing with the first outer region and for welding of the extruded shroud to the forged base deck bottom;
   a forged base deck cover including a second outer region, the second outer region configured and arranged for interfacing with the lip of the extruded shroud and for welding to the extruded shroud; and
   a connecting structure, configured and arranged to provide hermetic sealing of a cavity defined by the base deck and the forged base deck cover, including
      a weld material configured and arranged to connect the extruded shroud to the forged base deck bottom and connect the forged base deck cover to the extruded shroud, and
      at least one shim configured and arranged to realloy the weld material.

2. The apparatus of claim 1, wherein the forged base deck bottom and extruded shroud include base deck features, and wherein the weld material is configured and arranged to have a varying weld depth defined by one or more of the base deck features proximate the weld.

3. The apparatus of claim 1, wherein the forged base deck bottom, extruded shroud, and forged base deck cover consist of a first aluminum alloy, and the apparatus further includes
   a first shim positioned between the forged base deck and the extruded shroud and consisting of a second aluminum alloy, the first shim configured and arranged to facilitate realloying of the first aluminum allopy within the first weld, and
   a second shim positioned between the extruded shroud and the base deck cover and consisting of a second aluminum alloy, the second shim configured and arranged to facilitate realloying characteristics of the first aluminum alloy within the second weld.

4. The apparatus of claim 3, wherein the first shim is part of the first weld and the second shim is part of the second weld.

5. The apparatus of claim 1, wherein the first and second welds are configured and arranged to provide a total rate of low density atmosphere leakage into the cavity that is not greater than 1 cm$^3$/year (1×10$^{-8}$ cm$^3$/sec).

6. The apparatus of claim 1, wherein the base deck cover includes an elongated vertical portion that extends downward along a direction that is parallel to a line defining an exterior of the base deck, the interface between the base deck cover and base deck defining a location of the second weld.

7. The apparatus of claim 1, wherein the base deck and the base deck cover are configured and arranged to form a housing that internally supports a spindle motor adapted to rotate at least one data storage medium, and an actuator assembly adapted to support at least one data transducer adjacent the at least one data storage medium.

8. The apparatus of claim 1, wherein the lip of the extruded shroud is configured and arranged to interface with cavities of the base deck bottom and the base deck cover to form a mechanical labyrinth that prevents the formation of a secondary cavity in the cavity of the base deck where the base deck bottom and extruded shroud interface.

9. The apparatus of claim 1, wherein the weld material includes a first weld and a second weld that are impermeable to a helium atmosphere with a pressure higher than a standard earth atmospheric pressure.

10. The apparatus of claim 1, further including a secondary base deck cover positioned between the base deck cover and a low density atmosphere within the cavity, the secondary base deck cover configured and arranged to retain low density atmosphere within the cavity, prior to the first and second welds being formed.

11. The apparatus of claim 1, wherein the weld material includes a first weld that joins the extruded shroud to the forged base deck bottom at an outer sidewall of the forged base deck bottom, and includes a third weld that joins the extruded shroud to the forged base deck bottom at an inner region of the forged base deck bottom that forms a wall of the cavity.

12. The apparatus of claim 1, wherein the interface of the first outer region of the forged base deck bottom and the lip of the extruded shroud form a butt joint, and the base deck and the base deck cover include exterior surfaces with complementary opposing draft angles that meet at the butt joint.

13. A method including the steps of:
   providing a base deck bottom, a shroud, and a base deck cover,
   joining the base deck bottom to the shroud via an impermeable weld, and
   joining a base deck including the base deck bottom and the shroud to the base deck cover via another impermeable weld that joins the shroud to the base deck cover, and thereby hermetically sealing a cavity there within, the cavity being defined by an inner surface of the shroud extending laterally around the cavity and an upper surface of the base deck bottom.

14. The method of claim 13, wherein the joining of the base deck bottom and the shroud further includes inserting a shim of a first aluminum alloy, different than a second aluminum alloy from which the base deck bottom and the shroud comprise, between the base deck bottom and the shroud, and using the shim to form the impermeable weld.

15. The method of claim 13, further including at least one of the following:
   welding an interior joint between the base deck bottom and shroud,
   sealing an interior joint between the base deck bottom and the shroud with epoxy, or implementing a mechanical labyrinth between the impermeable weld and an interior joint between the base deck bottom and the shroud.

16. The method of claim 13, wherein the shroud and the base deck bottom include features of a disc drive, and joining the base deck bottom to the shroud further includes varying depth of the impermeable weld based on one or more of the disc drive features proximate the weld.

17. The method of claim 13, further including machining portions of the provided base deck bottom, shroud, and base deck cover to remove plating, prior to the joining steps.

18. The method of claim 13, further including
installing a secondary base deck cover that retains low density atmosphere within the cavity, wherein the cavity encloses a disc drive, and
testing the disc drive for function and low density atmosphere leakage, prior to joining the base deck to the base deck cover.

19. A method of including the steps of:
providing a base deck bottom, a shroud, and a base deck cover,
forming a base deck by joining the base deck bottom and the shroud via an impermeable weld, interfacing a plurality of lips and cavities between the base deck bottom and the shroud, and using the plurality of lips and cavities to form a mechanical labyrinth, and
joining the base deck to the base deck cover via another impermeable weld and thereby hermetically sealing a cavity there within.

20. A method including the steps of:
joining a base deck bottom to a shroud via a first impermeable weld;
applying a non-hermetic seal to a disc drive cavity having a lower surface defined by an upper surface of the base deck bottom and sidewalls defined by an inner surface of the shroud, and using the non-hermetic seal to retain a low density atmosphere therein at a pressure higher than a standard earth atmospheric pressure;
verifying operation of a disc drive assembly by testing the assembly while using the non-hermetic seal to enclose a low density atmosphere;
in response to said verifying being indicative of a failure of said disc drive, unsealing the disc drive cavity, reworking the disc drive assembly, reapplying the non-hermetic seal, and repeating the verifying step; and
in response to said verifying being indicative of proper operation of said disc drive, applying a hermetic seal to the disc drive cavity by joining a base deck including the base deck bottom and the shroud to a base deck cover via a second impermeable weld.

* * * * *